United States Patent [19]
Okino

[11] Patent Number: 4,978,976
[45] Date of Patent: Dec. 18, 1990

[54] IMAGE RECORDER WITH PLURAL BEAM SCAN SYNCHRONIZATION

[75] Inventor: Yoshiharu Okino, Kanagawa, Japan

[73] Assignee: Fuji Photo Film Co., Ltd., Kanagawa, Japan

[21] Appl. No.: 248,767

[22] Filed: Sep. 26, 1988

[30] Foreign Application Priority Data

Sep. 25, 1987 [JP] Japan .................. 62-240210

[51] Int. Cl.$^5$ .................. G01D 15/16; H04N 1/46
[52] U.S. Cl. .................. 346/108; 358/75
[58] Field of Search .................. 346/107 R, 108, 160; 358/75, 78, 296

[56] References Cited

U.S. PATENT DOCUMENTS 4,467,334  8/1984  Anzai .................. 346/108
4,760,407  7/1988  Arimoto .................. 346/108

FOREIGN PATENT DOCUMENTS 57-179836  11/1982  Japan .
57-179840  11/1982  Japan .
61-278849  12/1986  Japan .
62-209444   9/1987  Japan .

Primary Examiner—Mark J. Reinhart
Attorney, Agent, or Firm—Sughrue, Mion, Zinn, Macpeak & Seas

[57] ABSTRACT

In an image recording apparatus in which a photosensitive material is scanned simultaneously with a plurality of light beams different in wavelength to record an image, a line synchronization sensor detects the scanning synchronization of one of the light beams which is selected as a reference light beam, a one-dimensional array sensor spaced a certain distance from the line synchronization sensor in the scanning direction detects the light beams, and the output signals of the sensors are utilized to detect the shift in irradiating position of each of the light beams, whereby the timing of application of the light beams is controlled.

5 Claims, 3 Drawing Sheets

IMAGE RECORDER WITH PLURAL BEAM SCAN SYNCHRONIZATION

BACKGROUND OF THE INVENTION

This invention relates to an image recording apparatus which applies a plurality of light beams different in wavelength to a photo-sensitive material to record an image thereon.

One example of an apparatus in which a density signal representing an image is converted into an optical signal, and the optical signal is applied to a photo-sensitive material to record the image thereon is a color image recording apparatus in which at least three (red, green and blue) gas lasers or semiconductor lasers are used for optical exposure.

In one example of an image recording apparatus of this type, in order to apply three light beams having desired intensity substantially to one and the same point on the color photo-sensitive material, three light beams are emitted in parallel, and the optical axes of the light beam thus emitted are aligned with one another with half-mirrors or dichroic mirrors in the optical exposure operation. However, the apparatus is disadvantageous in that the number of components in the optical system is relatively large, and delicate adjustment is required for completely aligning the optical axes of the three light beams with one another, thus taking a relatively long period of time.

On the other hand, a method may be employed in which the three light beams in parallel are applied to the photo-sensitive material by scanning, as they are, and the shifts in irradiation of the three light beams are measured during the manufacture of the apparatus, so that the light emission timing is adjusted according to the shifts in irradiation of the light beams thus measured. In the timing adjustment, for instance the three light beams' image-formed positions are subjected to photoelectric conversion by means of a microscope and a television camera to obtain image signals, from which the shifts of the light beams' image-formed positions are measured. The shifts thus measured are stored in nonvolatile storage in the image recording apparatus, so that the light emission timing is thereafter controlled in the optical exposure operation. Accordingly, it is necessary to provided a relatively intricate device for the image-formed position adjustment. And the provision of such a device does not work for the shifts of the light beams' image formed positions which occur accidently or with the lapse of time.

SUMMARY OF THE INVENTION

Accordingly, an object of this invention is to eliminate the above-described difficulties accompanying a conventional image recording apparatus.

More specifically, an object of the invention is to provide an image recording apparatus in which the exposure position adjustment can be achieved readily and the readjustment can be made, and a particular space is not substantially required for those adjustments.

The foregoing object and other objects of the invention have been achieved by the provision of an image recording apparatus in which an image is recorded on a photo-sensitive material by irradiating the photo-sensitive material with a plurality of light beams different in wavelength by simultaneous scanning; which, according to the invention, comprises: line synchronization detecting means for detecting the scanning synchronization of one of the plurality of light beams which is selected as a reference light beam; irradiating light beam detecting means for detecting the plurality of light beams at a position spaced a predetermined distance from the line synchronization detecting means in the scanning direction; detecting means for utilizing output signals of the two detecting means, to detect the irradiating position shift of each of the plurality of light beams; and light emission timing control means for utilizing output signals of the detecting means, to determine the timing of irradiation of the photo-sensitive material with the plurality of light beams.

In the apparatus of the operation, first the time of scanning the space between the line synchronization detecting means and the irradiating light beam detecting means is measured, and then when it is estimated that the reference light beam scans near the line synchronization detecting means, the reference light beam is emitted and detected, and the time interval from that time instant until an one of the light beams is detected by the irradiating light beam detecting means is measured. The difference between the two measurement values is the irradiating position shift. The above-described operation is carried out on the remaining light beams, to detect the shifts in irradiating position from the reference light beam. According to the results of detection, the light emission timing can be controlled.

The nature, principle and utility of the invention will become more apparent from the following detailed description when read in conjunction with the accompanying drawings.

DETAILED DESCRIPTION OF THE PREFERRED EMBODIMENT

Figure 1:
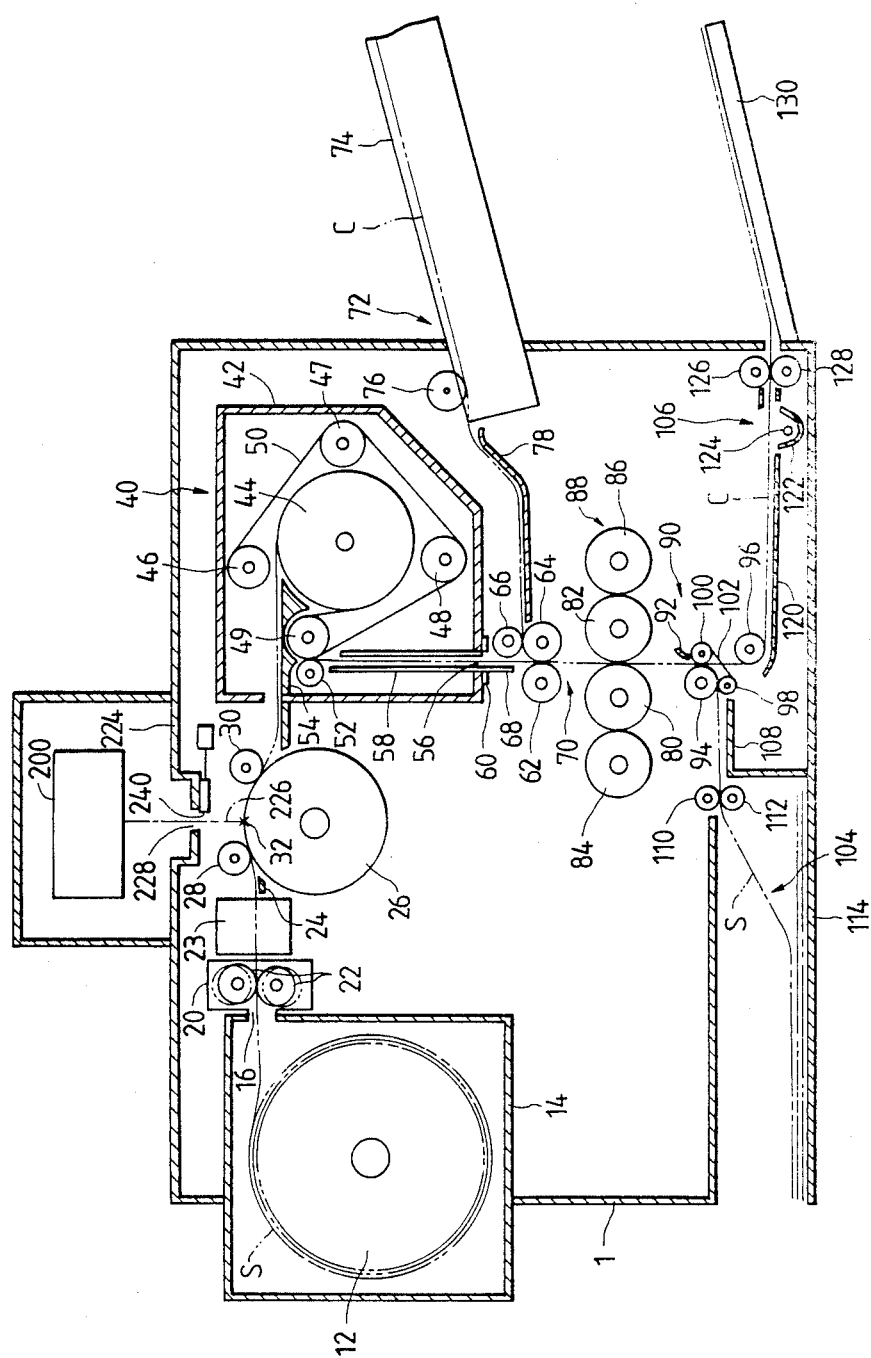
FIG. 1 is an explanatory diagram outlining the construction of one example of an image recording apparatus according to this invention.

Examples of a photo-sensitive material employable in the invention are a positive color photo-sensitive material and a negative color photo-sensitive material which are sensitive to blue, green and red light beams. Furthermore, a so-called infrared color film sensitive to green, red and infrared ranges may be employed. In the invention, a color photo-sensitive material may be a thermal developing color photo-sensitive material or a photo-sensitive pressure sensitive color photo-sensitive material. One example of the thermal developing color photo-sensitive material has been disclosed, for instance, by Japanese patent application (OPI) No. 179840/1982 (the term "OPI" as used herein means an "unexamined published application") filed by the present applicant. The material is a diffusion transfer type thermal developing color photo-sensitive material containing a dye releasing material which releases diffusing dye during thermal development; more specifically, it has photo-sensitive silver halogenide, organic silver salt oxidizer, hydrophobic binder, dye releasing assistant, and reducive dye supplying material which releases diffusing dye on the support.

One example of the photo-sensitive pressure-sensitive color photo-sensitive material has been disclosed, for instance, by Japanese patent application (OPI) No. 179836/1982 filed by the present applicant. With the color photo-sensitive material, the polymerizing compound is hardened according to an image to be recording, and is then pressurized, to form a visible image. The material is made up of a support, and synthetic macromolecular resin wall capsules containing vinyl compound, photo-polymerization initiator, and colorant precursor, which are formed on the support.

Photo-sensitive materials of the type that silver halogenide, after being exposed, is developed by thermal developing, while in association with the developing operation polymerizing compound is hardened and is then pressurized to obtain a visible image have been disclosed by Japanese patent application (OPI) No. 278849/1986 and Japanese patent application No. 53881/1986 filed by the present applicant.

With the photo-sensitive material disclosed by Japanese patent application (OPI) No. 278849/1986, after a thermal developing operation, color image forming material is transferred onto an image receiving material having an image receiving layer, to form an image on the image receiving layer. The photo-sensitive material is manufactured by coating a support at least with photo-sensitive silver halogenide, reducing agent, polymerizing compound, and color image forming material. Of these materials, at least the polymerizing compound and the color image forming material are, in combination, sealed in micro-capsules.

In the case of the photo-sensitive material disclosed by Japanese patent application No. 53881/1986, an image is formed thereon without the use of an image receiving material. The photo-sensitive material is manufactured by using silver halogenide, reducing agent, polymerizing compound, and two kinds of materials which color when contacted. More specifically, the photo-sensitive material is made up of a support, and a photo-sensitive layer formed on the support in such a manner that one of the two kinds of materials and the polymerizing compound are contained in micro-capsules, and the other is provided outside the micro-capsules containing the polymerizing compound.

The spectral sensitivities of the above-described thermal developing color photo-sensitive materials and photo-sensitive pressure sensitive color photo-sensitive materials are generally in the green, red and infrared ranges. However, if sensitizing dye is selectively used, then photo-sensitive materials having spectral sensitivities in other ranges such as blue, green and red ranges.

Now, one example of an image recording apparatus according to this invention will be described with reference to the accompanying drawings.

As shown in FIG. 1, an optical exposure unit 200 is provided in the upper portion of a housing 1, and the part of the housing 1 containing the optical exposure unit 200 is separated from the other parts by a partition wall 224. An opening 228 is formed in the part of the housing 1 which crosses the optical axis of the optical exposure unit 200.

A photo-sensitive cartridge 14, in which a photo-sensitive material roll 12 formed by winding a photo-sensitive pressure sensitive thermal developing color photo-sensitive material S (hereinafter referred to merely as "a photo-sensitive material S", when applicable) is accommodated, is detachably mounted on one side of the housing 1. A pair of photo-sensitive material supplying rolls 22 and 22 built in a magazine-connected dark box 20 is arranged at the photo-sensitive material supplying outlet 16 of the photo-sensitive material cartridge 14, so that the photo-sensitive material S is supplied from the photo-sensitive material roll 12 by a predetermined length, when required.

As the front end of the photo-sensitive material S approaches the photo-sensitive material supplying rolls 22 and 22, the latter 22 and 22 are moved away from each other as indicated by the phantom lines, to smoothly supply the photo-sensitive material S. A cutter unit 23 for cutting the photo-sensitive material S, and a guide board 24 are disposed in front of the magazine-connected dark box 20 (i.e., down stream of the dark box 20 as viewed in the direction of movement of the photo-sensitive material S).

An exposed photo-sensitive material supporting roll 26, and two photo-sensitive material nipping rolls 28 and 30 abutted against the roll 26 are disposed in front of the guide board 24. The photo-sensitive material S guided by the guide board 24 is brought into close contact with the exposed photo-sensitive material supporting roll 26 by means of the photo-sensitive material nipping rolls 28 and 30, and is subjected to optical exposure at the position 32 between the nipping rolls 28 and 30 by the optical exposure unit 200.

A thermal developing unit 40 for thermally developing the photo-sensitive material S thus exposed is arranged ahead of the exposed photo-sensitive material supporting roll 26. The thermal developing unit 40 comprises: a heat-insulating developing housing 42; a heating roll 44 arranged in the developing housing and heated to about 120° C.; an endless belt 50 supported by four belt supporting rolls 46, 47, 48 and 49 and wound on the heating roll 44 with an angle of about 270°; and a nipping roll 52 abutted against the supporting roll 49.

The thermal developing unit 40 further comprises: a guide device 54 which guides the photo-sensitive material S from the exposed photo-sensitive material supporting roll 26 to the heating 44, and separates the photo-sensitive material S thermally developed from the heating roll 44; and a vertical guide device 58 for guiding the developed photo-sensitive material S forwarded by the supporting roll 49 and the nipping roll 52 to the outlet 56 of the developing housing 42. A photo-sensitive material's front edge detecting sensor 60 is provided at the outlet 56.

A photo-sensitive material and image receiving sheet piling unit 70 is disposed immediately below the outlet 56 of the developing housing 42. The unit 70 comprises: a pair of pushing rolls 62 and 64 pushed against each other; a nipping roll 66 abutted against the pushing roll 64; and a guide member 68 for guiding an image receiving sheet C forwarded by the pushing roll 64 and the nipping roll 66 to the nipping region of the pushing rolls 62 and 64.

An image receiving sheet supply unit 72 is provided beside the photo-sensitive material and image receiving sheet piling unit 70. The unit 72 comprises: an image-receiving sheet supplying cassette 74 which is detachably mounted on the other side of the housing 1 in such a manner that it is protruded from the housing 1; an image-receiving-sheet supplying roll 76 for supplying the image receiving sheets from the cassette 74 one at a time; and a guide board 78 for guiding to the nipping region of the pushing roll 64 and the nipping roll 66 the image receiving sheet C forwarded by the supplying roll 76. The width of the image receiving sheet C is smaller by about 6 mm than that of the photo-sensitive material S. The photo-sensitive material and image receiving sheet piling unit 70 operates to lay the image receiving sheet C and the photo-sensitive material S one on another in such a manner that the image receiving sheet C is located at the center of the photo-sensitive material S in the widthwise direction; i.e., the central axial line of the image receiving sheet is in alignment with that of the photo-sensitive material.

An image transferring unit 88 is provided below the piling unit 7. The unit 88 comprises: a pair of nipping rolls 80 and 82 pushed against each other; and back-up rolls 84 and 86 for making the pressure of the nipping rolls 80 and 82 uniform in the axial direction thereof. The nipping rolls 80 and 82 are pushed against each other at about 500 kg/cm$^2$.

A photo-sensitive material and image receiving sheet separating unit 90 is provided below the image transferring unit 88. The separating unit 90 comprises: a guide member 92; a first forwarding roll 94, a second forwarding roll 96; and a separating belt 102 laid over guide rolls 98 and 100 in such a manner that it presses only the photo-sensitive material S at both sides of the first forwarding roll 94.

A photo-sensitive material disposing section 104 is provided on one side of the separating unit 90, and an image fixing unit 106 is provided on the opposite side of the separating unit 90. The photo-sensitive material disposing section 104 comprises: a guide member 108; a pair of conveying rolls 110 and 112; and a disposing box 114. In the photo-sensitive material disposing section 104, the guide member 108 guides the photo-sensitive material S to the conveying rollers 110 and 112, and the latter 110 and 112 delivers the material S into the disposing box 114.

The image fixing unit 106 comprises: a guide member 120; an ultraviolet lamp with a reflector 122; and a pair of conveying rolls 126 and 128. In the image fixing unit 106, the image receiving sheet C forwarded from the separating unit 90 is guided by the guide member 120, and ultraviolet light is applied to the image receiving sheet C for about five (5) seconds, to fix the image.

A take-out tray 130 for receiving the image receiving sheet C is provided in front of the image fixing unit 106; more specifically, it is connected to the housing 1 in such a manner that it is protruded from the housing 1.

Figure 2:
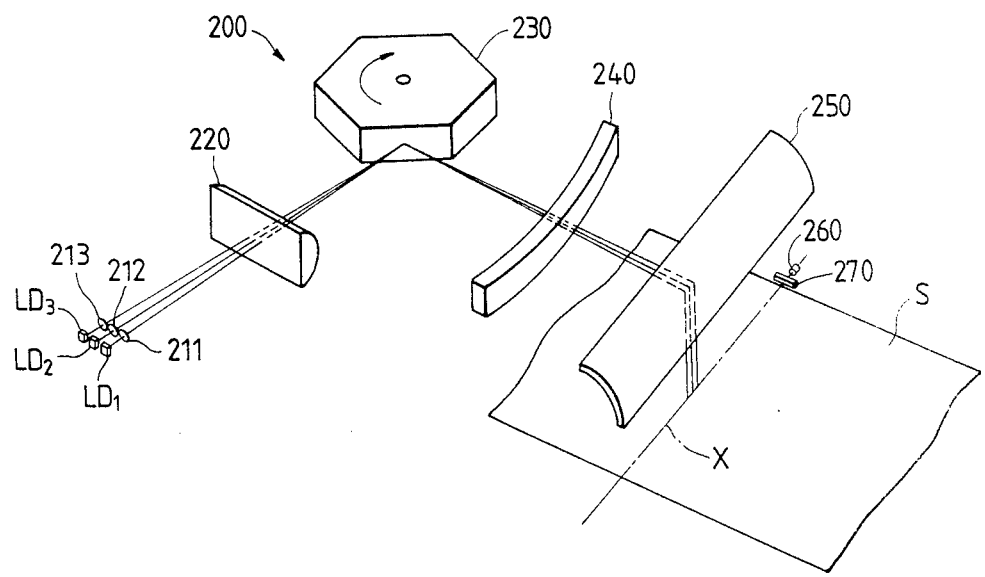
FIG. 2 is an explanatory diagram outlining the arrangement of an optical exposure unit in the image recording apparatus shown in FIG. 1.

The optical exposure unit 200 is shown in FIG. 2 in more detail. In the optical exposure unit 200, semiconductor lasers are employed as light sources by way of example.

The output light beams of a red light semiconductor laser $LD_1$, green light semiconductor laser $LD_2$, and blue light semiconductor laser $LD_3$, after passing through respective collimator lenses 211, 212 and 213, and a cylindrical lens 220, are applied substantially to one and the same point on the reflecting surface of a polygon mirror 230 which rotates while reflecting light, to perform a scanning exposure operation. As the laser beams are applied substantially to one and the same point as was described above, the polygon mirror 230 can be minimum in size. In the scanning operation, the output laser beam are deflected at the same speed.

These irradiating light beams are applied to the reflecting surface of the polygon mirror 230 at respective incident angles, and reflected therefrom at respective reflection angles. The light beams thus reflected are passed through an f$\theta$ lens 240 and reflected by a cylindrical mirror 250, so that they are applied to the photo-sensitive material S. The semiconductor lasers $LD_1$, $LD_2$ and $LD_3$ are arranged on one and the same plane so that the exposure positions of the three light beams on the photo-sensitive material S are on a scanning line. A line synchronization sensor 260 for the synchronization of scanning lines is provided outside of the photo-sensitive material S and on the side of the scanning start point. In addition, a one-dimensional array sensor 270 for detecting the irradiating light beams is disposed between the line synchronization sensor 260 and the photo-sensitive material S in such a manner that the sensor 270 is in parallel with the photo-sensitive material S and perpendicular to the scanning line X.

Figure 3:
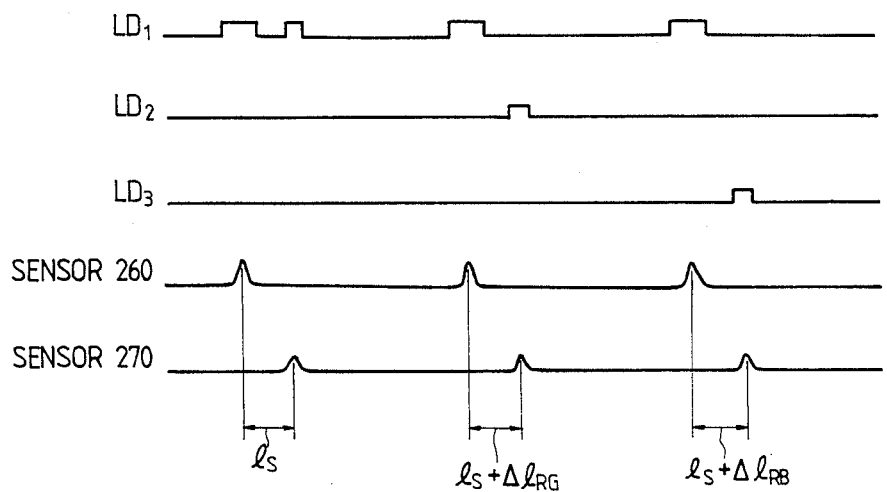
FIG. 3 is a time chart for a description of the emissions of light beams, and the operations of sensors in the image recording apparatus of the invention.

Prior to the image recording operation, an irradiating position shift is corrected as follows:

FIG. 3 is a time chart showing the light emissions of the semiconductor lasers and the operations of the sensors during the irradiating-position-shift correcting operation.

For instance, the output light beam of the red light semiconductor laser $LD_1$ will be employed as a reference light beam. The polygon mirror 230 is rotated. Under this condition, near the line synchronization sensor 260 only the semiconductor laser $LD_1$ is caused to emit a light beam so that it is detected by the line synchronization sensor 260, and near the one-dimensional array sensor 270 only one of the three semiconductor lasers is caused to emit a light beam so that it is detected by the sensor 270. The detection signals of these sensors are applied to a position shift detecting device (not shown), as a result of which the detecting device detects the distance between the position (reference position) of the line synchronization sensor 260 and that of the one-dimensional array sensor 270 which is determined by the scanning of a laser beam. The above-described operations are carried out for each semiconductor laser, so that the position shift detecting device detects the relative irradiating position shifts by obtaining the differences between the distance $1_S$ detected with the semiconductor laser $LD_1$ and the distances $1_S+\Delta 1_{RG}$ and $1_S+\Delta 1_{RB}$ detected with the other semiconductor lasers $LD_2$ and $LD_3$. The position shift signals are applied to a light emission timing control device (not shown) provided for the semiconductor lasers $LD_1$, $LD_2$ and $LD_3$, so that the light emission timing is shifted whereby the irradiating positions in the scanning line direction are corrected.

With the one-dimensional array sensor 270, the output light beam of each of the semiconductor lasers can be detected as a distribution of intensity in the auxiliary scanning direction. Therefore, with respect to the scanning line shift in the auxiliary scanning direction, the scanning line is changed by the light emission timing control device with the peak of the distribution of intensity as a reference, whereby the irradiating positions in the auxiliary scanning direction are also corrected.

The above-described correction can be carried out even the image recording operation, and can be performed immediately after the power switch is turned on. Furthermore, if the correction is carried out during the manufacture and stored in non-volatile memory as was described above, then the irradiating position shift control can be achieved in the same manner.

In the case where the range of irradiating position shift in the auxiliary scanning direction can be set to a practically small value, the scanning line change is unnecessary, and the one-dimensional array sensor can be replaced by a point sensor. Furthermore, it is not always necessary to apply the irradiating light beams to one point on the polygon mirror; that is, the light beams may be applied near the scanning line on the photo-sensitive material.

In the above-described image recording apparatus, the semiconductor lasers are employed as the light sources; however, any other means may be employed if it can represent image in color by combination of a plurality of light beams different in wavelength.

As was described above, in the image recording apparatus of the invention, the sensors are arranged substantially on the scanning line on the photo-sensitive material, and the irradiating light beams are detected directly, with the result that the exposure position shift is readily detected with high accuracy. Furthermore, the sensors used, being small in size, can be built in the image recording apparatus, and re-adjustment of the sensor can be readily achieved.

What is claimed is:

1. An image recording apparatus in which a photo-sensitive material is scanned on a single scanning line with a plurality of light beams different in wavelength simultaneously to record an image, which comprises:

line synchronization detecting means for detecting the scanning synchronization of one of said plurality of light beams which is selected as a reference light beam;

irradiating light beam detecting means for detecting said plurality of light beams at a position spaced a predetermined distance from said line synchronization detecting means in the scanning direction;

detecting means for utilizing output signals of said two detecting means, to detect the irradiating position shift of each of said plurality of light beams in said scanning direction; and light emission timing control means for utilizing output signals of said detecting means, to determine the timing of irradiation of said photo-sensitive material with said plurality of light beams.

2. An apparatus as claimed in claim 1, in which light sources for emitting said plurality of light beams are a red light semiconductor laser, a green light semiconductor laser, and a blue light semiconductor laser, respectively.

3. An apparatus as claimed in claim 1, in which said line synchronization detecting means is provided outside of said photo-sensitive material.

4. An apparatus as claimed in claim 3, in which said irradiating light beam detecting means is provided between said line synchronization detecting means and said photo-sensitive material.

5. An apparatus as claimed in claim 1, in which said irradiating light beam detecting means is a one-dimensional array sensor which is arranged in such a manner that the longitudinal direction of said one-dimensional array sensor is perpendicular to said scanning direction.

* * * * *